J. PETRELLI.
MARINE REVERSING GEAR.
APPLICATION FILED JULY 3, 1908.
937,090.
Patented Oct. 19, 1909.
2 SHEETS—SHEET 1.
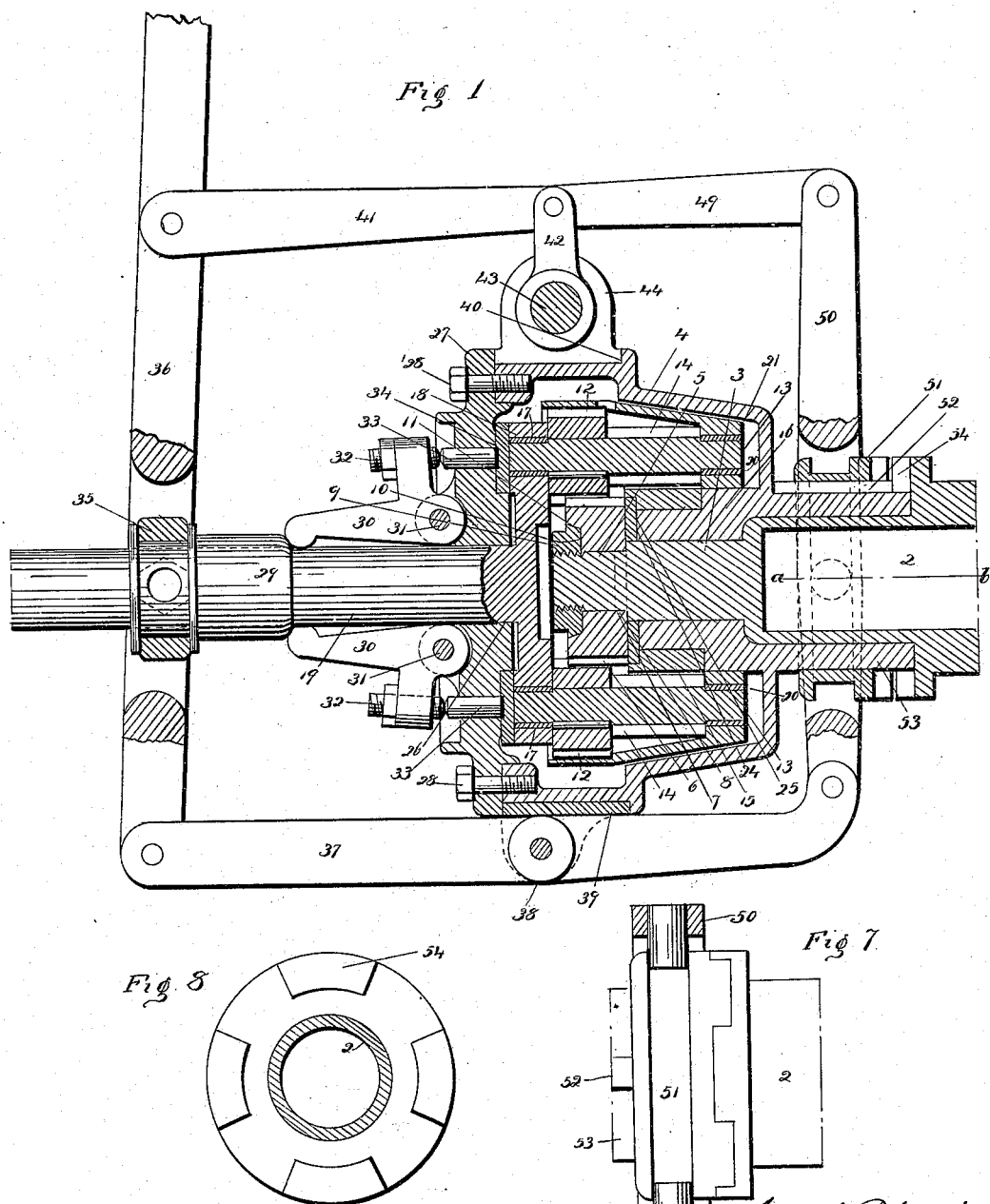

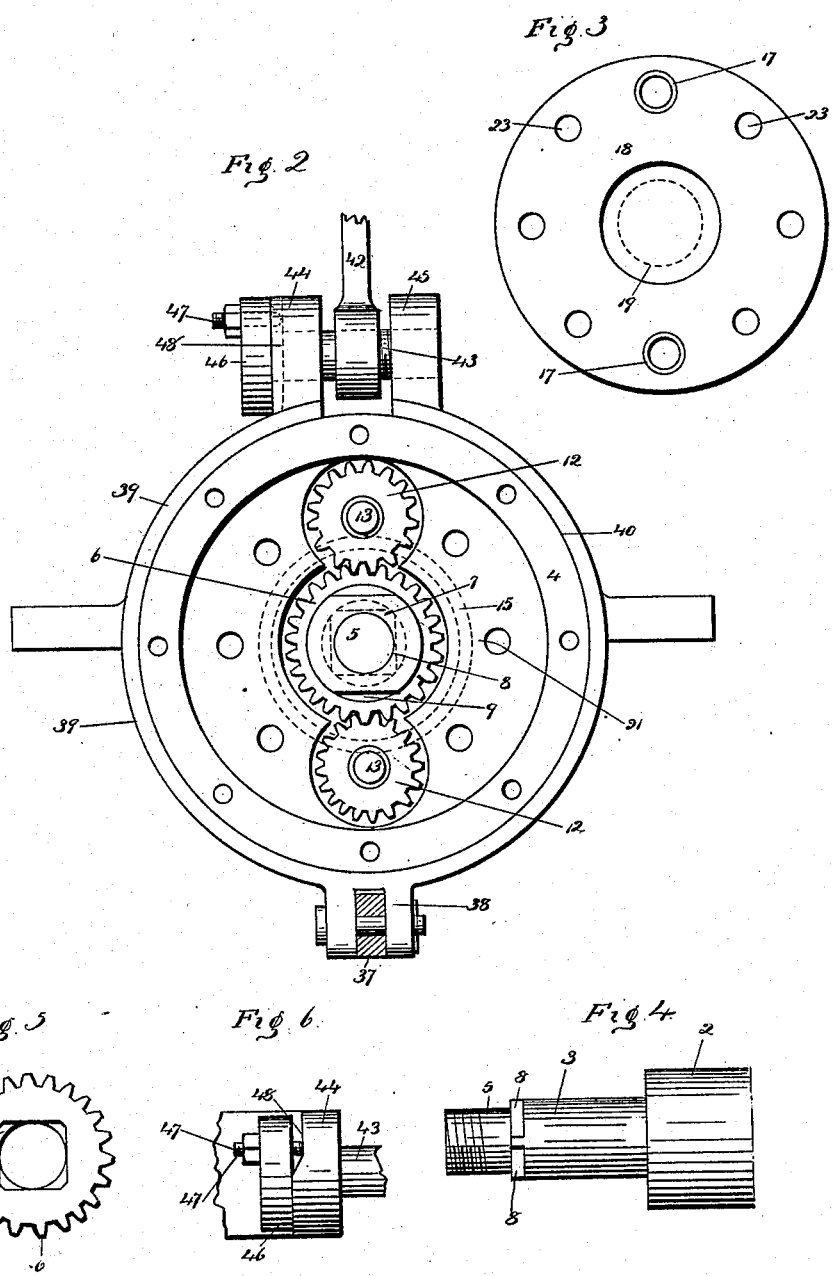

UNITED STATES PATENT OFFICE.

JOSEPH PETRELLI, OF NEW HAVEN, CONNECTICUT, ASSIGNOR TO THE SNOW & PETRELLI MFG. CO., OF NEW HAVEN, CONNECTICUT, A CORPORATION.

MARINE REVERSING-GEAR.

937,090.  Specification of Letters Patent.  Patented Oct. 19, 1909.

Application filed July 3, 1908. Serial No. 441,791.

*To all whom it may concern:*

Be it known that I, JOSEPH PETRELLI, a citizen of the United States, residing at New Haven, in the county of New Haven and State of Connecticut, have invented a new and useful Improvement in Marine Reversing-Gears; and I do hereby declare the following, when taken in connection with the accompanying drawings and the numerals of reference marked thereon, to be a full, clear, and exact description of the same, and which said drawings constitute part of this specification, and represent, in—

Figure 1 a view in vertical section of marine reversing gears constructed in accordance with my invention. Fig. 2 a detached view in elevation showing the gear-case, the friction cone and the brake-band, the cover of the gear-case being removed and the flange of the driven shaft. Fig. 3 a detached view showing the flange of the driven shaft. Fig. 4 a detached broken view in side elevation of the driving shaft. Fig. 5 a detached view of the driving gear. Fig. 6 a broken plan view showing a portion of the mechanism employed for contracting the brake-band upon the gear-case. Fig. 7 a sectional view of the positive clutch mechanism on the line $a$—$b$ of Fig. 1. Fig. 8 a detached face view of the clutch-collar carried by the driving shaft which is shown in transverse section.

My invention relates to an improvement in marine reversing gears designed with particular reference for use in conjunction with with gasolene engines in motor boats, the object being to produce a convenient, reliable and effective device constructed with particular reference to compactness of form, to lightness and to taking the load with the minimum of shock. Furthermore the device being self-contained, is easily applied.

With these ends in view my invention consists in certain details of construction and combinations of parts as will be hereinafter described and pointed out in the claims.

In carrying out my invention as herein shown, I employ a chambered driving-shaft 2 which receives the engine-shaft, not shown. The said shaft is formed with a long running-bearing 3 upon which the gear-case 4 is in effect mounted. The said bearing 3 is formed with a stem 5 which carries the driving-gear 6 the inner face of which is formed with recesses 7 receiving square shoulders 8 formed between the bearing 3 and stem 5, whereby the gear 6 is prevented from rotation upon the stem 5. The said gear is held in place upon the said stem by a nut 9 entered into a tapered recess 10 in the outer face of the gear, the edge of the nut being formed with a corresponding taper 11 for frictionally securing it against turning loose. The said driving-gear 6 meshes into two corresponding driven gears 12 located opposite each other and mounted upon shafts 13 also carrying driven pinions 14 which mesh into an annular or ring-like fulcrum gear 15 secured to the concentric hub 16 of the gear case 4. The inner ends of the shafts 13 run in bushings 17 in a circular flange 18 formed integral with the inner end of the driven shaft 19 which is sometimes spoken of as the "stub-shaft", and which is connected to the propeller shaft, not shown. The outer ends of the said shafts 13 run in bushings 20 located in the outer end of the tapered friction cone 21 to which the flange 18 is secured by screws not shown passing through holes 23 in the said flange as seen in Fig. 3.

The inner face of the fulcrum gear 16 is formed with a recess 24 for the reception of a steel washer 25 which receives the thrust of the driving-gear 6 when the same is moved from left to right with the driving shaft 2 when the mechanism is reversed. The said cone 21 has sliding bearing upon the hub 4 so as to permit its exterior face to be brought into frictional contact with a corresponding face formed within the tapered outer end of the gear case for the purpose of frictionally coupling the cone 21 with the case for their rotation together, whereby the driving and driven shafts are connected together and the power of the engine transmitted to the propeller. The gear-case and cone together form what I may call the inside friction clutch of the device. I thus provide a bearing for the outer end of the cone upon the gear-case 4 and thereby supplement the bearing of the driven shaft. The said driven-shaft has its main bearing in a hole 26 formed in the center of a circular cover 27 secured by bolts 28 to the inner end of the gear-case 4. A clutch-cone 29 sliding upon the driven-shaft 19 coacts with the cam-like outer ends of two bell-crank levers 30 hung upon studs 31 mounted in the cover 27, the said levers being provided with adjustable screws 32 the inner ends of which coact with plungers 33 extending through the cover 27 and engaging with a thrust-ring 34 which in turn engages with the flange 18 of the driven-shaft. The said cone 29 is carried by a yoke 35 swiveled in a vertically arranged handle-lever 36 having its lower end pivoted to a lever 37 pivoted about midway of its length to a lug 38 upon the lower face of a brake-band 39 let into an annular recess 40 in the circumference of the gear-case 4 and providing for reversing the shaft 19, and hence the propeller by gripping the gear-case 4 so as to prevent it from rotation with the driving shaft 2, whereby the gears and pinions already described are brought into play for reversing the rotation of the cone and hence the rotation of the driven shaft. The gear-case and brake-band together form what I may call the outside friction brake of the device.

To clamp the brake-band 39 upon the gear-case 4 I employ a horizontal link 41 pivoted at one end to the handle-lever 36 and at its opposite end to a link 42 secured to a threaded shaft 43 supported at its ends in ears 44 and 45 extending upward from the ends of the band. The said shaft 43 is furnished at one end with a head 46 carrying a screw 47 coacting with a cam-surface 48 formed upon the outer face of the ear 44. Supposing the handle-lever 36 to be pulled from right to left or outward for the purpose of reversing the propeller, the links 41, 42, will be moved correspondingly, whereby the screw 47 will be forced to ride up the steep portion of the cam 48 with the result of drawing the ears 44 and 45 together so as to clamp the band 39 upon the gear-case 4. This is what might be called the "quick movement" of the band, the final gripping of the band upon the case being effected by the threading of the shaft 43 into the ear 45. When the handle-lever 36 is pushed inward, the links 41 and 42 will be moved in the opposite direction and the riding of the screw 47 down the steep pitch of the cam 48 will effect the quick release of the band 39 from the gear-case 4.

To provide for positively coupling the driven-shaft 19 with the driving shaft 2, or in other words, to provide for positively connecting the propeller-shaft with the engine shaft after the latter has been, so to speak, "picked up" by friction, I employ a link 49 connected at its outer end with the links 41 and 42 and having its inner end connected with a vertical lever 50 the lower end of which is pivoted to the extreme inner end of the lever 37. The said lever 50 carries a sleeve 51 held by a key 52 against rotation upon the outer portion 53 of the gear case hub 16, the said sleeve 51 being formed upon its outer face with lugs whereby it is interlocked with a clutch collar 54 carried by the driving shaft 2 and having corresponding lugs.

Although I have already to a certain extent, described the operation of my improved mechanism in connection with the description of its construction, I will briefly set forth the mode of its operation.

Supposing the engine to be running and the handle-lever to be in its intermediate position, the gears and pinions will be idly operated without transmitting any power to the propeller shaft for the reason that neither the friction-clutch, nor the positive clutch, nor the friction-brake are in operation. If now the handle-lever be pushed forward, the gear-case and cone forming the internal friction clutch, will be frictionally coupled together whereby the driving shaft and the driven shaft will be coupled together through the medium of the gears which will in effect constitute a lock. The propeller shaft will now be driven in the same direction as the engine shaft, while all of the gears remain at rest. If the handle-lever is pushed to the limit of its forward movement the internal friction clutch will be supplemented by the positive clutch. When the handle-lever is pulled rearward, or toward the person using it, the brake-band forming the friction-brake is caused to firmly grip the gear-case, whereby the same is firmly locked against rotation and with it the fulcrum gear 15 which now constitutes the center of a planetary movement of the driven gears and driven pinions. This effects the reverse rotation of the driven shaft and hence of the propeller shaft, for, although the gear-case is locked against rotation, as well as the fulcrum-gear, the driving shaft continues to be rotated by the engine with the effect of operating the driving gear 6 which in turn operates the driven gears 12 and the driven pinions 14 which are carried by the flange 18 of the driven shaft 19 which is reversely operated.

I claim:—

1. In marine reversing gears, the combination with a driving shaft for connection with the engine shaft and a driven shaft for connection with the propeller shaft, the said driven shaft being provided with a flange of a driving gear mounted upon the driving shaft, a driven gear and a driven pinion carried by the said flange, the driven gear meshing into the driving gear carried by the driving shaft, a gear-case mounted upon the driving shaft, a fulcrum gear carried by the said case and meshed into by the driven pinion aforesaid, and a friction clutch between the driven shaft and the gear-case.

2. In marine reversing gears, the combination with a driving shaft and a driven shaft, of a gear case mounted upon the driving shaft, a friction cone carried by the driven shaft and arranged to coact with the gear-case to form a friction clutch, gears and pinions connecting the two shafts and case and normally idle but operating to reverse the driven shaft when the gear case is held against rotation and means for holding the said case against rotation.

3. In marine reversing gears, the combination with a driving and a driven shaft, of a gear-case mounted upon the driving shaft, a cone located within the said case and carried by the driven shaft, means for frictionally coupling the cone with the gear case for the transmission of the motion of the driving shaft to the driven shaft, gears and pinions connecting the said shafts and case, an external friction brake for the gear-case, and means for applying the said brake for holding the case against rotation to bring into play the reversing or planetary action of the gears and pinions.

4. In marine reversing gears, the combination with the driving and driven shafts thereof, of a gear-case mounted upon the driving shaft, a cone located within the said case and carried by the driven shaft, gears and pinions located within the said cone and connecting the two shafts and case, means for frictionally engaging the cone with the gear-case, a friction brake for the gear-case, and a positive clutch between the gear-case and the driving shaft.

5. In marine reversing gears, the combination with a driving and a driven shaft, of a gear-case mounted upon the driving shaft, a friction cone located within the said gear-case and carried by the driven shaft, gears and pinions located within the said cone and connecting the said shafts and case, a positive clutch between the driving shaft and the gear-case, a friction brake for the gear case, a handle-lever, and connections between the said cone, clutch and brake and handle-lever, whereby the said cone, clutch and brake are operated thereby.

6. In marine reversing gears, the combination with a driving and a driven shaft, of a gear-case mounted upon the driving shaft, a friction cone located within the gear case and carried by the driven shaft and movable into and out of frictional engagement with the gear case, gears and pinions connecting the two shafts and case and normally idle but operating to reverse the driven shaft when the said gear-case is held against rotation, plungers mounted in the case for longitudinally moving the cone, and means also carried by the gear case for operating the said plungers.

7. In marine reversing gears, the combination with the driving and driven shafts thereof, of a gear-case mounted upon the driving-shaft, a friction cone located within the gear case and carried by the driven-shaft, gears and pinions located within the friction cone and connecting the said shafts and case, a cover for the gear-case, plungers mounted in the said cover for coaction with the friction cone to move the same into friction engagement with the gear case, one or more bell-crank levers carried by the gear-case cover for operating the said plungers, and a cone located upon the driven shaft for operating the said bell-crank lever or levers.

8. In marine reversing gears, the combination with the driving and the driven shaft, of a gear-case mounted upon the driving shaft, a friction cone carried by the driven shaft and located within the gear case, gears and pinions located within the friction cone and connecting the two shafts and gear case, plungers carried by the gear-case, a thrust ring interposed between the said plungers and the friction cone, bell-crank levers carried by the gear case for operating the plungers, and a cone concentric with the driven shaft for operating the bell-crank levers.

9. In marine reversing gears, the combination with the driving and driven shafts thereof, of a gear-case mounted upon the driving shaft, a friction cone carried by the driven shaft and located within the gear case, means for moving the cone laterally within the gear case for frictionally engaging it therewith, a cover for the said cone, a driving gear mounted upon the driving shaft, one or more driven gears and driven pinions journaled in the cone and its cover, the driven gear or gears being meshed into by the said driving gear, and a fulcrum gear mounted upon the gear case and meshed into by the driven pinion or pinions.

10. In marine reversing gears, the combination with the driving shaft, of a driven shaft provided with a circular flange, a gear-case mounted upon the driving shaft, a friction cone carried by the said flange and located within the gear case, and gears and pinions interposed between the said shafts and the gear case for connecting the same, including one or more driven gears and one or more driven pinions journaled in the said flange and cone.

11. In marine reversing gears, the combination with the driving and driven shafts, of a gear-case mounted on the said driving-shaft, gears and pinions for connecting the said shafts and gear-case including a fulcrum gear and a driving gear, and a washer interposed between the driving gear and the fulcrum gear.

12. In marine reversing gears, the combination with a driving and a driven shaft, of a gear-case mounted upon the driving-shaft, a friction cone located within the gear case and carried by the driven-shaft, gears and pinions located within the said cone and connecting the two shafts and the gear-case, a brake-band applied to the gear case for holding the same against rotation, a handle lever, connection between the said handle-lever and the brake-band for applying the latter, and a lever connecting the lower end of the said handle-lever with the lower portion of the brake-band.

13. In marine reversing gears, the combination with a driving and a driven shaft, of a gear-case mounted upon the driving shaft, a friction cone carried by the driven shaft and located within the said case in which it is laterally movable, gears and pinions for connecting the said shafts and case, mechanism for laterally moving the friction-cone, a handle lever connected with the said mechanism for operating the same, a brake-band applied to the gear case, a positive clutch coacting with the gear-case and the driving shaft, a lever for the said positive clutch, links connecting the handle lever with the brake-band and a lever pivoted to the brake-band and having the lower ends of the handle-lever and the clutch-lever pivoted to its opposite ends.

14. In marine reversing gears, the combination with a driving shaft and a driven shaft, of a gear-case mounted upon the said driving shaft, a friction clutch carried by the driven shaft, a positive clutch carried by the driving shaft for supplementing the said friction clutch, gears and pinions connecting the two shafts and case and normally idle, but operating the driven-shaft when the gear case is held against rotation, means for consecutively applying the said clutches and releasing them in the reverse order of their application, and means for holding the case against rotation at which time both clutches are released.

15. In marine reversing gears, the combination with a driving shaft and a driven shaft, of means interposed between the two shafts for transmitting the rotation of the former to the latter, including a friction clutch, a positive clutch to supplement the friction clutch, and means for consecutively applying the said clutches and releasing them in the reverse order of their application.

16. In marine reversing gears, the combination with a driving shaft and a driven shaft, of a gear-case mounted upon the driving shaft, gears and pinions interposed between the two shafts and case, a friction clutch for locking the said gears and pinions and hence connecting the two shafts, a positive clutch interposed between the driving shaft and the gear-case for connecting the same, and means for consecutively applying the said clutches and releasing them in the reverse order of their application.

In testimony whereof, I have signed this specification in the presence of two subscribing witnesses.

JOSEPH PETRELLI.

Witnesses:
  FREDERIC C. EARLE,
  CLARA L. WEED.